United States Patent
Ittel et al.

(10) Patent No.: US 8,414,757 B2
(45) Date of Patent: Apr. 9, 2013

(54) PROCESS FOR IMPROVING THE OXIDATION RESISTANCE OF CARBON NANOTUBES

(75) Inventors: Steven Dale Ittel, Wilmington, DE (US);
Gillian Althea Maria Reynolds, Wilmington, DE (US); Ming Zheng, Wilmington, DE (US)

(73) Assignee: E I du Pont de Nemours and Company, Wilmington, DE (US)

(*) Notice: Subject to any disclaimer, the term of this patent is extended or adjusted under 35 U.S.C. 154(b) by 442 days.

(21) Appl. No.: 12/714,420

(22) Filed: Feb. 26, 2010

(65) Prior Publication Data

US 2010/0219738 A1 Sep. 2, 2010

Related U.S. Application Data

(60) Provisional application No. 61/156,073, filed on Feb. 27, 2009.

(51) Int. Cl.
*C25D 9/00* (2006.01)
*H01J 1/02* (2006.01)

(52) U.S. Cl. ........ 205/220; 205/118; 205/316; 205/317; 313/311; 445/51

(58) Field of Classification Search .................. 205/118, 205/316, 220; 313/311; 445/51
See application file for complete search history.

(56) References Cited

U.S. PATENT DOCUMENTS

| | | | |
|---|---|---|---|
| 4,857,799 A | 8/1989 | Spindt et al. | |
| 5,015,912 A | 5/1991 | Spindt et al. | |
| 7,449,081 B2 | 11/2008 | Bouchard et al. | |
| 2002/0074932 A1 | 6/2002 | Bouchard et al. | |
| 2004/0055892 A1* | 3/2004 | Oh et al. ........................ | 205/109 |
| 2005/0200261 A1 | 9/2005 | Mao et al. | |
| 2006/0021879 A1* | 2/2006 | Lin et al. ........................ | 205/109 |
| 2006/0057927 A1 | 3/2006 | Kang et al. | |
| 2006/0063464 A1 | 3/2006 | Kang et al. | |

FOREIGN PATENT DOCUMENTS

| | | |
|---|---|---|
| WO | 94/15350 A1 | 7/1994 |
| WO | 94/15352 A1 | 7/1994 |
| WO | 94/28571 A1 | 12/1994 |

* cited by examiner

*Primary Examiner* — Harry D Wilkins, III
*Assistant Examiner* — Bryan D. Ripa

(57) ABSTRACT

The disclosure relates to processes for the electrochemical modification of electron emitting materials such as carbon nanotubes. The processes improve the oxidation resistance of the electron emitting materials when they are fired in an oxygen-containing atmosphere such as air. The disclosure also relates to the preparation of cathodes or cathode assemblies, for use in a field emission device, wherein are contained an electron field emitter made from such electron emitting material.

18 Claims, 5 Drawing Sheets

PROCESS FOR IMPROVING THE OXIDATION RESISTANCE OF CARBON NANOTUBES

This application claims priority under 35 U.S.C. §119(e) from, and claims the benefit of, U.S. Provisional Application No. 61/156,073, filed Feb. 27, 2009, which is by this reference incorporated in its entirety as a part hereof for all purposes.

TECHNICAL FIELD

This disclosure relates to processes for the modification of electron emitting materials such as carbon nanotubes. The disclosure also relates to the preparation of cathodes or cathode assemblies, for use in a field emission device, wherein are contained an electron field emitter made from such modified electron emitting materials.

BACKGROUND

Electron emitting materials such as carbon nanotubes (CNTs) have unique and useful electrical properties, and can be used in the fabrication of the cathode of a field emission device. However, the use of electron emitting materials in such applications can be constrained by their susceptibility to damage in one or more of the fabrication steps involved in the manufacture of a field emission device.

A need thus remains for a process for providing a robust layer of electron emitting material on a substrate, with good uniformity and low material consumption, and where the resultant layer of electron emitting material resists damage in subsequent steps in the manufacturing process for field emission devices. There also exists a need for patterned films of electron emitting materials with good performance characteristics to be used in electronic applications, for example in a cathode assembly for a field emission device.

SUMMARY

Figure 1:
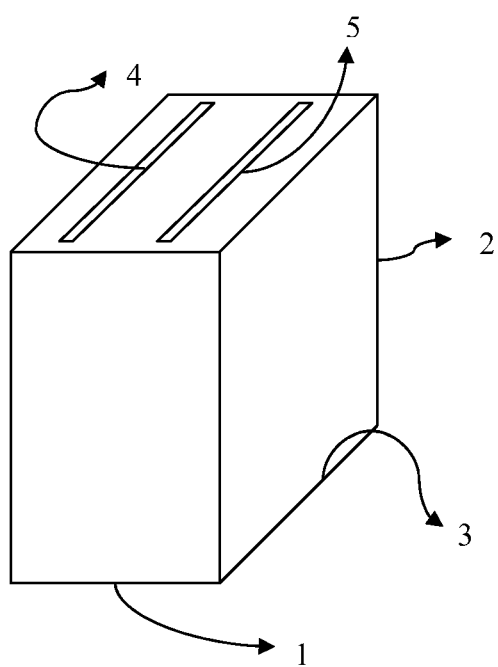
FIG. 1 shows a rectangular electrochemical cell containing an electrolyte solution into which a cathode and an anode are inserted in a parallel fashion.

In one embodiment, this invention provides a process for the electrochemical modification of an electron emitting material by (a) providing an electrochemical cell that comprises (i) a cathode; (ii) an anode that comprises a layer of electron emitting material; (iii) an aqueous electrolyte in contact with the cathode and the layer of electron emitting material of the anode, wherein the electrolyte comprises a metallate; (iv) a first electrically-conducting pathway connecting the cathode to an electrical power supply; and (v) a second electrically-conducting pathway connecting the electrical power supply to the anode; and (b) applying a voltage to the electrochemical cell.

In other embodiments, in the layer of electron emitting material, the electron emitting material can reside therein in a pattern. The anode can include a substrate on which is deposited the layer of electron emitting material; the substrate can be conductive; and/or there can be further deposited on the substrate a layer or pattern of conductive material.

In yet other embodiments, the processes hereof can also involve depositing a layer of electron emitting material on a substrate, and incorporating the substrate into the electrochemical cell to provide the anode thereof. The processes can also involve screen printing a paste of electron emitting material onto the substrate to deposit electron emitting material thereon. The processes can also involve patterning a photoresist material on the substrate, spreading a paste of electron emitting material on the photoresist material, and irradiating and developing the electron emitting material to deposit a layer thereof on the substrate. In other embodiments, the substrate can be transparent, the photoresist material can reside on a first side of the substrate, and the electron emitting material can be irradiated from a second side of the substrate.

In yet other embodiments, the processes hereof can also involve removing the substrate from the electrochemical cell. The substrate can also be installed in a field emission device, or in a cathode assembly in, or to be installed in, a field emission device. The processes can also involve washing, drying and firing the substrate, and the substrate can be fired in air at a temperature in the range of about 250° C. to about 650° C. The processes can also involve providing adhesive activation to the substrate.

In yet other embodiments, the invention hereof also provides a substrate prepared as set forth herein, a cathode assembly that includes such a substrate, and a field emission device that includes such a cathode assembly.

The processes hereof improve the oxidation resistance of the electron emitting materials that are treated according to the processes hereof. The increased oxidation resistance of electron emitting materials so treated provides a useful benefit when they are fired in an oxygen-containing atmosphere such as air.

DETAILED DESCRIPTION

Disclosed herein are processes for the preparation of patterned or unpatterned layers of electron emitting material on a substrate. These processes involve the use of an electrochemical cell that contains a cathode, an anode, a first electrically-conducting pathway connecting the cathode to an electrical power supply, and a second electrically-conducting pathway connecting the electrical power supply to the anode.

The anode can include a substrate onto which is deposited a paste of electron emitting material to form a layer of electron emitting material thereon. The layer of electron emitting material can be patterned or unpatterned.

An aqueous electrolyte is disposed between the cathode and the anode and is in contact with the cathode and the anode. More specifically, the aqueous electrolyte is in contact with the cathode and the layer of electron emitting material of the anode. The aqueous electrolyte also contains a metallate. When a positive potential is applied at the anode relative to the cathode, there occurs an electrochemical modification of the electron emitting material in the layer of the anode. The modification of the electron emitting material improves the oxidation resistance thereof during processes such as air firing. When electron emitting material modified according to the processes hereof is incorporated into the cathode assembly of a field emission device, the improved oxidation resistance of the electron emitting material can provide more flexibility, lower manufacture cost and improved performance for such devices since the cathode assembly can be fired in air rather than nitrogen with little or no decrease in emission performance.

Suitable materials for the cathode of the electrochemical cell include stainless steel and other non-oxidizable conductors.

Suitable substrates for use in the anode in the electrochemical cell include any material to which electron emitting material can be made to adhere. Silicon, glass, metal or a refractory material such as alumina can serve as the substrate. For display applications, the substrate is typically glass or soda lime glass, which is transparent. If the electron emitting material is non-conducting and a non-conducting substrate is used, a film of an electrical conductor can be deposited on the substrate prior to deposition of the electron emitting material to serve as the cathode electrode in the cathode assembly of the field emission device and provide a means to apply a voltage to the electron emitting material. In some embodiments, the substrate comprises a glass, such as a soda lime glass, that is coated with a layer of conductive material such as indium tin oxide ("ITO") to provide conductivity to the substrate. Alternatively, conductive materials such as silver or chromium can be deposited on the substrate by thick film paste or evaporative methods in a layer or a pattern. In one embodiment, silver paste can be fired onto glass at about 500-550° C. in air or nitrogen to provide a conductive substrate. The conducting layer (e.g. silver or ITO) can then be over-printed with the CNT-containing thick film paste.

If the substrate that is used in the anode in the electrochemical cell will ultimately be used in the cathode assembly of a field emission device, it is desirable that the substrate be provided with conductive pathways onto which the electron emitting material is deposited. Conductive pathways on a substrate can be produced by a number of processes. In one embodiment, a non-conductive substrate can be completely coated with a conductive material and then a pattern created in the conductive material. Alternatively, a conductive material can be printed onto a non-conductive substrate in a pattern-wise manner. Conductors of the patterned conductive substrate can comprise indium tin oxide, silver or chromium.

The electron emitting material that is deposited in making a patterned substrate for the cell anode typically contains an organic medium, solvent, surfactant and a low softening-point glass frit, a metallic powder, a metallic paint or a mixture thereof, in addition to the electron emitting materials. If the layer of electron emitting material is to be photopatterned, it typically further contains a photoinitiator, a developable binder and a photohardenable monomer that may include, for example, at least one addition polymerizable ethylenically-unsaturated compound having at least one polymerizable ethylenic group.

Electron emitting materials suitable for use herein include acicular forms of carbon such as carbon nanotubes ("CNTs"), polyacrylonitrile-based (PAN-based) carbon fibers, pitch-based carbon fibers, and carbon fibers grown from the catalytic decomposition of carbon-containing gases over small metal particles. The latter have graphene platelets arranged at an angle with respect to the fiber axis so that the periphery of the carbon fiber consists essentially of the edges of the graphene platelets. The angle may be an acute angle or 90°.

CNTs suitable for use herein are generally about 0.5-2 nm in diameter with an aspect ratio of at least 5. The aspect ratio is defined as the ratio of the length to the diameter. In one embodiment, the aspect ratio is between 10 and 2000. CNTs are comprised primarily of carbon atoms, however the CNTs can be doped with other elements such as metals. Suitable carbon nanotubes include single-walled nanotubes (SWNTs) and multi-walled nanotubes (MWNTs). A SWNT comprises only one nanotube. A MWNT, on the other hand, comprises several concentric nanotubes, each having a different diameter. Thus, the smallest diameter tube is encapsulated by a larger diameter tube, which in turn, can be encapsulated by another larger diameter nanotube. For MWNTs, the aspect ratio is calculated using the diameter of the largest or outer-most carbon nanotube.

CNTs can be produced by a variety of methods, and are also commercially available. Methods of CNT synthesis include laser vaporization of graphite, arc discharge, and a HiPCo (high pressure carbon monoxide) process. Chemical vapor deposition (CVD) can also be used in producing carbon nanotubes. Additionally CNTs can be grown via catalytic processes, both in solution and on solid substrates.

When depositing the electron emitting material such as a CNT in the form of a paste, the paste can include an organic medium and solvent to suspend and disperse the solids (e.g. the CNTs, glass frit, and metallic powders) in the paste to provide a rheology that is compatible with the patterning processes, which may be for example screen printing. Suitable organic media include cellulosic resins such as ethyl cellulose and alkyd resins. Butyl carbitol, butyl carbitol acetate, dibutyl carbitol, dibutyl phthalate, and terpineol are examples of useful solvents. The solvents (and organic media) are chosen to meet the viscosity and volatility requirements for use in a specific thick film paste.

Suitable low-softening point glass frit for use in the paste softens sufficiently at the firing temperature to adhere the electron emitting material to the substrate. Suitable glass frits include lead or bismuth glass frits, and calcium or zinc borosilicates. If a higher electrical conductivity is desired, the paste can also contain a metal or metallic powder, for example, silver or gold.

In one embodiment, the paste can contain about 40 wt % to about 80 wt % solids, based on the total weight of the paste. The solids include the electron emitting material, glass frit and/or metallic components. In one embodiment, the paste contains about 0.01-6.0 wt % electron emitting material, about 40-75 wt % silver in the form of fine silver particles, and about 3-15 wt % glass frit, based on the total weight of the paste.

Variations in the composition can be used to adjust the viscosity and the final thickness of the paste to be deposited on the substrate. The paste can be prepared by three-roll milling a mixture of the electron emitting material, organic medium, surfactant, solvent, glass frit, and other components.

The paste can be screen printed onto the substrate using, for example, a 165-400-mesh stainless steel screen. The paste can be deposited as a continuous film or in the form of a desired pattern. In one embodiment, the pattern of the paste can be made by screen-printing the desired pattern onto the anode substrate. Screen-printable pastes can be formulated with a variety of solvents and polymers to facilitate printing and drying, leaving a pattern with sufficient mechanical integrity to remain adhered to the substrate through the subsequent processing steps. See, for example the description of such a process as set forth in U.S. Pat. No. 7,449,081, which is by this reference incorporated in its entirety as a part hereof for all purposes.

Creating a desired pattern of electron emitting material on a substrate can also be accomplished using conventional photoimaging techniques. For example, a paste containing a photopolymer system and the electron emitting material can be photo-exposed through a mask, and then developed to provide a pattern on the surface of the substrate of the anode, such as an array of dots containing electron emitting material. Alternatively, a photoresist can be coated over a conductive pattern on the substrate. After exposure through a photomask, the photoresist can then be developed, leaving a pattern in the remaining photoresist. In one embodiment, the pattern is an array of wells in the remaining photoresist. A paste can be deposited into these wells. The residual photoresist material can be removed and to provide an array of dots containing electron emitting material on the surface of the substrate of the anode.

The electrochemical cell comprises an anode, which may contain a substrate onto which is deposited electron emitting material. A first electrically-conducting pathway connects the cathode of the electrochemical cell to an electrical power supply, and a second electrically-conducting pathway connects the electrical power supply to the anode. A typical electrochemical cell suitable for use herein is shown in FIG. 1 wherein the dimensions of width 1, height 2 and depth 3 are shown, in addition to slots 4, 5 for the anode and cathode therein. At least a portion of the electron emitting material of the anode is in contact with the electrolyte and/or a metallate that is contained therein. In one embodiment, 40% or more, or 50% or more, or 60% or more, and yet 100% or less, or 90% or less, or 80% or less, of the area of the surface of the electron emitting material is in contact with the electrolyte and/or metallate. At least a portion of the cathode is also in contact with the electrolyte.

A suitable electrolyte for use in the electrochemical cell is an aqueous solution that contains one or more metallates. A "metallate" is an anionic species containing one or more metal ions. In some embodiments, the metallate is used in its salt form; in other embodiments, the metallate is used in its acid form. A solution of a salt of a metallate can be prepared directly from the salt, or the salt can be generated in situ in solution by neutralization of a metallate acid with amines or metal hydroxides.

Suitable metallate salts are exemplified by the oxo species having an anionic Keggin structure:

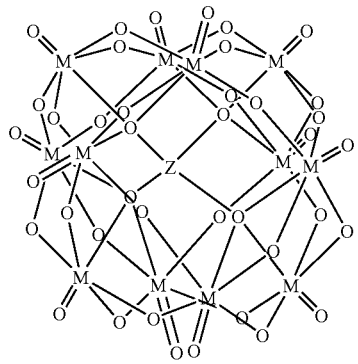

wherein M=Mo, Z=P, or Si, and the overall charge is determined by the oxidation states of the metals. Suitable metallate salts of this type include $(NH_4)_3[M_{12}PO_{40}]$ and $Na_4[Mo_{12}SiO_{40}] \cdot xH_2O$ Suitable metallate acids include the oxo species $H_3[Mo_{12}PO_{40}]$, $H_4[Mo_{12}SiO_{40}]$, and $H_3[W_{12}PO_{40}]$.

Suitable metallates also include polyhedral boranes, $B_dH_d^{2-}$, when the borane is water stable (e.g. d=10 and 12), and carboranes, $CB_dH_d^-$, for such species that are water stable. Suitable species include the carborane

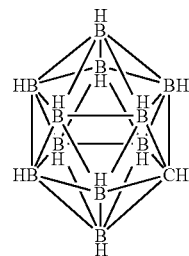

$Cs[CB_{11}H_{12}]$, or cesium (1:1) dodecahydro-1-carbadodecaborate(1-), and the borane

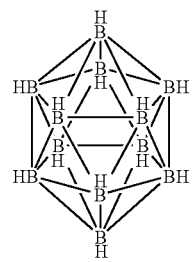

$Cs_2[B_{12}H_{12}]$, or cesium dodecahydrododecaborate(2-).

Other suitable metallates include those that contain a complex anion containing a metal ligated to several atoms or small groups. The metal can be, for example, one of the transition elements, and the ligand can be oxygen or another chalcogenide, or a cyanide group. The chalcogenide metallates include oxometallates, thiometallates, selenometallates and tellurometallates; the cyanide metallates include cyanometallates. Oxometallates include, for example, permanganate, chromate and vanadate. Thiometallates include, for example, tetrathiomolybdate and similar ions. Cyanometallates include, for example, ferricyanide and ferrocyanide.

The metallate species in solution need not be that which was added to the solution. For example, Tris/Borate/EDTA (known as "TBE", and available in a concentrate form from Sigma-Aldrich, St. Louis Mo.) is a buffer solution containing a mixture of the Tris base ($[H_2NC(CH_2OH)_3]_2$), boric acid and EDTA (ethylenediaminetetraacetic acid). The boric acid, $B(OH)_3$, when added to water is in the form of the hydrated monomeric borate,

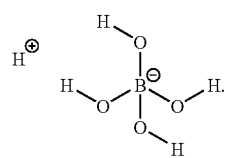

But at the pH of the buffer, it is in the form $[H_3NC(CH_2OH)_3]_2^+[B_4O_7]$, where $[H_3NC(CH_2OH)_3]^+$ is the cationic ammonium form of the Tris base; and the borate, shown with full hydration, is the tetraborate.

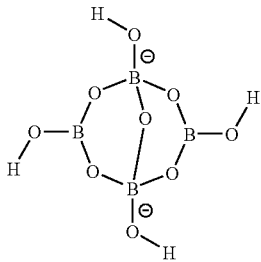

After installing the anode in the electrochemical cell, the cell is energized by, for example, operating the cell at a positive potential at the anode relative to the cathode of less than about 10 volts, or in the range of from about 2 to about 6 volts, or in the range of from about 3 volts to about 5 volts. The cell can also be operated at a positive potential at the anode relative to the cathode of about 1 volt or more, or about 2 volts or more, or about 3 volts or more, and yet about 10 volts or less, or about 6 volts or less, or about 5 volts or less. The cell can be operated for a period of time of from about 1 to about 10 minutes, or from about 2 to about 6 minutes, or from about 3 to about 5 minutes.

In one embodiment, the anode is removed from the cell after electrochemical treatment and heated or fired in air, for example in a belt furnace. The anode can optionally be rinsed with water, and/or dried prior to being fired. In one embodiment, the anode is subjected to adhesive activation before firing.

Alternatively, the anode can be activated after firing. The process of firing more securely anchors the electron emitting material to the surface of the substrate, resulting in an electron field emitter with excellent abrasion resistance. Firing can be performed at a temperature in the range of about 250° C. to about 650° C., or about 350° C. to about 550° C., or about 450° C. to about 525° C., for a period of time of about 5 to about 30 minutes, or about 10 to about 25 minutes, or about 10 to about 20 minutes, in nitrogen or air. Firing can also be performed at a temperature of about 250° C. or more, or about 350° C. or more, or about 450° C. or more; which temperature is, however, also about 650° C. or less, or about 550° C. or less, or about 525° C. or less; for a period of time of about 5 to about 30 minutes, or about 10 to about 25 minutes, or about 10 to about 20 minutes, in nitrogen or air.

The electron emitting material that has been deposited on the substrate can be subjected to "adhesive activation" after the firing process. The process of adhesive activation is described in U.S. Pat. No. 7,449,081. In one embodiment, the activation process comprises contacting a substrate printed with electron emitting material with an adhesive component, forming an adhesive contact with the electron emitting material. The adhesive contact provides sufficient adhesive force that when the adhesive component is separated from the substrate, a portion of the electron emitting material is removed or rearranged, thereby forming a new surface of the electron emitting material. This process "activates" the electron emitting material in that the emission intensity is higher after the activation process. "Adhesive activation" can be as simple as applying adhesive tape to the substrate surface and pulling it off. Removal of the adhesive material from the substrate generally removes a portion of the electron emitting material from the substrate surface.

After completion of the electrochemical treatment of the electron emitting material on the anode substrate and any subsequent processing, the substrate can be installed in a field emission device for use as part of the cathode assembly therein to provide electron emission. A cathode assembly typically contains a substrate, a cathode layer, a dielectric layer, and a gate layer in addition to the electron emitting material, although the gate layer and dielectric layer are not required. The electron emitting material, when energized, bombards the anode of the device with electrons. The anode of the field emission device is an electrode coated with an electrically conductive layer. When the field emission device is used in or as a display device where the cathode contains an array of pixels of the deposited electron emitting material, the anode in the display device can comprise phosphors to convert incident electrons into light. In such a device, the substrate of the anode of the field emission device is typically selected to be transparent so that the resulting light can be transmitted. A display device typically comprises a sealed unit, in which a cathode assembly and an anode are separated by spacers, with an evacuated space between the anode and the cathode assembly. This evacuated space is under partial vacuum so that the electrons emitted from the cathode assembly transit to the anode with only a small number of collisions with gas molecules. Frequently the evacuated space is evacuated to a pressure of less than $10^{-5}$ Torr.

A field emission device is useful in a variety of electronic applications, e.g. vacuum electronic devices, flat panel computer and television displays, back-light sources for LCD displays, emission gate amplifiers, klystrons and lighting devices. For example, a flat panel display having a cathode assembly containing an electron field emitter that contains an electron emitting material, and a phosphor capable of emitting light upon bombardment by electrons emitted by the electron field emitter, has been proposed. Such a display has the potential for providing the visual display advantages of the conventional cathode ray tube, and the depth, weight and power consumption advantages of the other flat panel displays. A flat panel display can be planar or curved. U.S. Pat. Nos. 4,857,799 and 5,015,912 disclose matrix-addressed flat panel displays using micro-tip cathodes constructed of tungsten, molybdenum or silicon. WO 94/15352, WO 94/15350 and WO 94/28571 disclose flat panel displays wherein the cathodes have relatively flat emission surfaces. These devices are also described in US 2002/0074932.

Materials as used in the processes hereof can be made by methods known in the art, or are available commercially from suppliers such as Alfa Aesar (Ward Hill Mass.), City Chemical (West Haven Conn.), Fisher Scientific (Fairlawn N.J.), Sigma-Aldrich (St. Louis Mo.) or Stanford Materials (Aliso Viejo Calif.).

EXAMPLES

The advantageous attributes and effects of this invention can be seen in a series of examples described below. The embodiments on which the examples are based are representative only, and the selection of those embodiments to illustrate the invention does not indicate that materials, conditions, specifications, components, reactants, techniques and protocols not described in these examples are not suitable for practicing this invention, or that subject matter not described in these examples is excluded from the scope of the appended claims and equivalents thereof.

Materials

TBE (Tris Borate Buffer Solution, Catalog Number 93290) was obtained from Sigma Aldrich.

Example 1

Modification with Tris/Borate/EDTA

Carbon nanotube powder made from a laser ablation process was incorporated at 1.0 wt % into a slurry containing ethylacetate and β-terpineol and sonicated. This slurry was then mixed into a thick film paste (Silver Paste Composition 7095, DuPont, Wilmington Del.) and roll-milled to a workable viscosity. A photoresist ("PR") (AZ P4620 from AZ Electronic Materials) was spin-coated onto an ITO-coated glass substrate. A mask containing a pattern with 20 micron diameter holes was placed onto the PR, and the substrate was imaged from the top under ultraviolet light. The imaged substrate was then soaked in AZ300MIF, a base developer, for 5 minutes then rinsed with DI water. Areas of PR that were exposed to light became soluble in the base developer, providing a pattern of 20 micron diameter openings in the PR. The substrate was then heated on a hot plate at 120° C. for 2 minutes.

The CNT-containing paste was screen printed as a continuous layer across the PR, with the open holes in the PR layer allowing the paste to make contact with the ITO surface. The substrate was exposed to ultraviolet light from the backside, through the glass and ITO, with the open holes in the photoresist serving as the exposure pattern. Exposure of the remaining unexposed PR to ultraviolet light made the PR soluble in an organic solvent. The CNT paste on the ITO that was exposed to the light through the holes in the PR became crosslinked and therefore insoluble. The substrates were rinsed at room temperature for 65 seconds in an NMP/$H_2O$ (4/1) organic solvent solution to remove the PR and the unexposed CNT paste lying on top of the PR. What remained on the ITO after rinsing was a patterned structure of 20 micron diameter CNT dots.

A 2"×2" stainless steel (cathode) and the 2"×2" screen-printed substrate on ITO (anode) were inserted in a parallel fashion into a rectangular cell (similar to that shown in FIG. 1) containing 15 mL of electrolyte solution. The electrolyte solution was a commercial solution of TBE concentrate (Sigma Aldrich, St. Louis Mo., TBE 10× Concentrate), diluted to the prescribed 10% with deionized water. A DC potential of 3 V (Princeton Applied Research, Oak Ridge, Tenn., Model 263A potentiostat) was applied between the two electrodes. After 4 minutes, the treatment was stopped, and the ITO substrate was taken out of the cell and allowed to dry in air.

This same treatment was performed on several substrates. Several other substrates were prepared as controls, and were not subjected to the electrochemical modification. All of the substrates were then fired in air to 400° C. peak for 21 minutes in a 10-zone belt furnace (Lindberg, 810 thick-film conveyor, Watertown Wis.). The substrates were then activated by placing an adhesive tape in contact with the patterned surface containing the carbon nanotube paste and pulling it off. Substrates were then incorporated into a diode device as the cathode, separated from the ITO-coated phosphor glass anode by a 620 μm spacer. The diode thus formed was placed in a vacuum chamber and evacuated to a base pressure below $1 \times 10^{-5}$ Torr.

Figure 2:
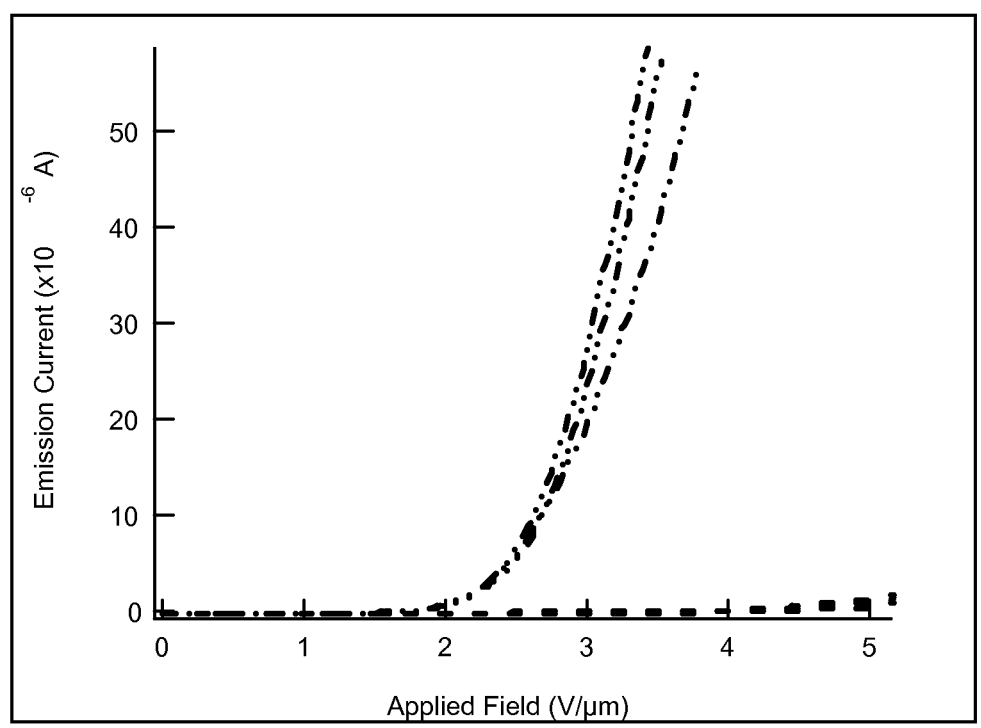
FIG. 2 shows the emission curves for samples treated with Tris/Borate/EDTA in an electrochemical cell as described in Example 1 and fired in air (dot-dash lines), and for control samples not subjected to electrochemical treatment before firing in air (dashed lines).

A negative voltage pulse with a pulse width of 60 microns at 60 Hz was applied using an IRCO high voltage source (Model F5k-10-02N, IRCO, Columbia Md.). The pulsing was supplied from a pulse generator (Stanford Research Systems, Sunnyvale Calif., Model DG535). The resulting emission current was measured as a function of applied voltage using a Keithley 2000 multimeter (Keithley Instruments, Cleveland Ohio). The currents as a function of field were recorded and are shown in FIG. 2. The dashed lines are the unmodified, air-fired control substrates, and emission currents are low over the entire range. The dash-dot line in FIG. 2 is the emission current from the electrochemically treated, air-fired sample. There is substantial emission starting at voltages of just over 2 V/μm. Lower operational fields for a given current are preferred.

Example 2

Modification with Boric Acid

Example 1 was repeated, but the TBE solution was replaced with 0.1 M boric acid (Sigma Aldrich). The modified and unmodified substrates were fired in air to 400° C. peak for 21 minutes in a 10-zone belt furnace. Additional unmodified substrates were fired in nitrogen at 425° C.

Figure 3:
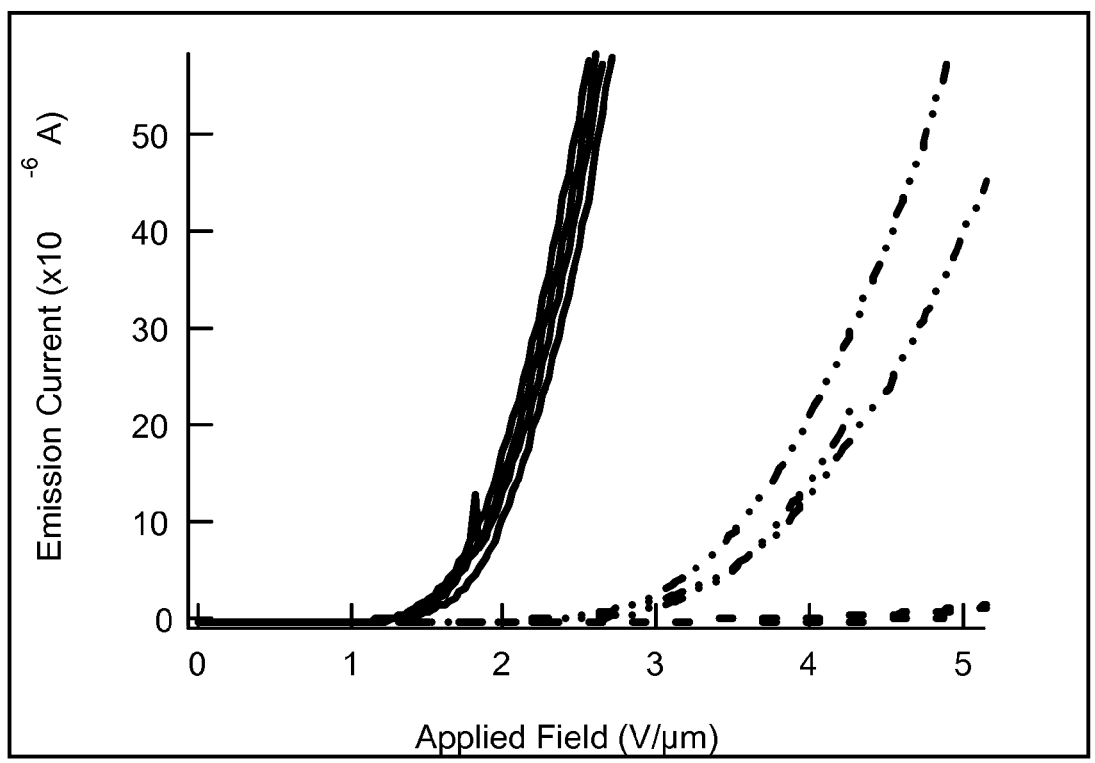
FIG. 3 shows the emission curves for samples treated with boric acid in an electrochemical cell as described in Example 2 and then fired in air (dot-dash lines), and for control samples not subjected to electrochemical treatment before firing in air (dashed lines). This figure also shows the emission curves for samples not subjected to electrochemical treatment before firing in nitrogen (solid lines).

The results are shown in FIG. 3. The solid lines are the emission current versus applied voltage for the nitrogen-fired, unmodified controls. As expected, the nitrogen-firing control samples display the best results. The dashed lines are the unmodified, air-fired substrates, and emission currents are seen to be low over the entire range. The dash-dot lines in FIG. 3 are the emission currents from the air-fired samples modified according to the processes hereof. There is substantial emission starting at voltages of just over 3 V/μm, and this is a significant improvement over the results from the unmodified, air-fired samples.

For an air-fired sample not subjected to electrochemical treatment, the applied field necessary for any emission was found to be generally greater than 5 V/μm. For the electrochemically treated samples, the fields needed were generally on the order of 4 V/μm.

Example 3

Modification with Triammonium Phosphomolybdate

Figure 4:
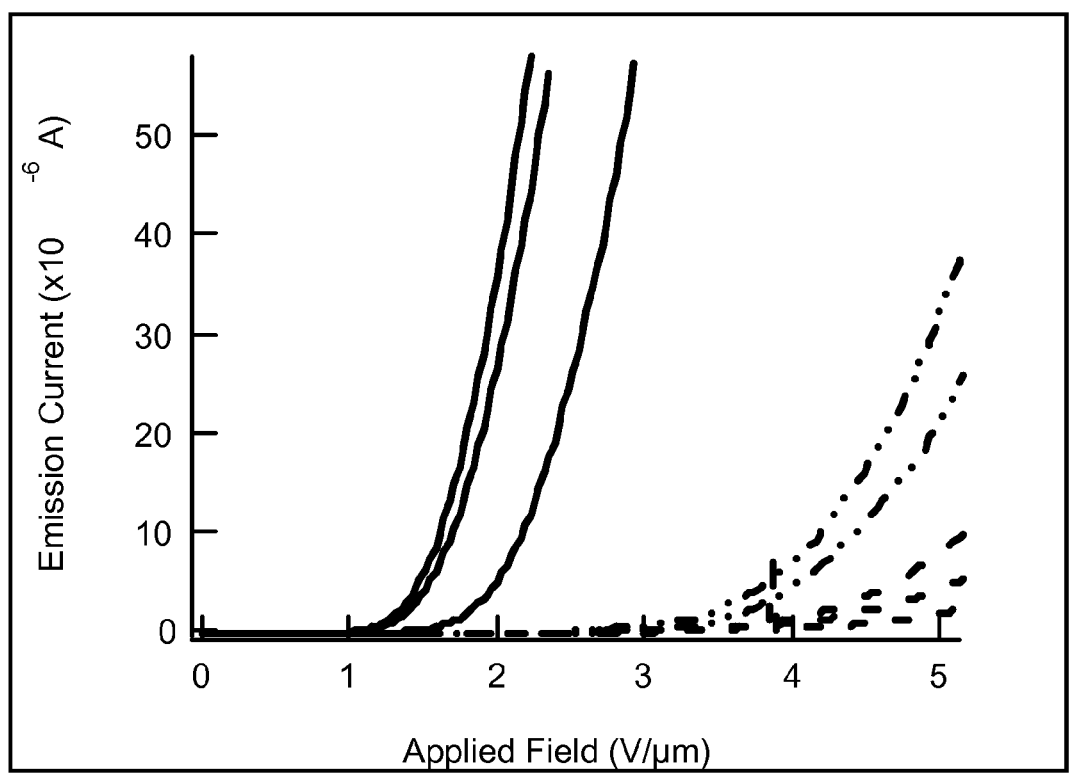
FIG. 4 shows the emission curves for samples treated with $[(NH_4)_3Mo_{12}PO_{40}]$ in an electrochemical cell as described in Example 3 and fired in air (dot-dash lines), and for control samples not subjected to electrochemical treatment before firing in air (dashed lines). This figure also shows the emission curves for untreated samples fired in nitrogen (solid lines).

Example 2 was repeated using triammonium phosphomolybdate[$(NH_4)_3Mo_{12}PO_{40}$] rather than TBE solution. The electrolyte contained 0.1% [$(NH_4)_3Mo_{12}PO_{40}$] in water. The results are shown in FIG. 4. The solid lines are the emission current versus applied voltage for the unmodified, nitrogen-fired controls. The nitrogen-fired control samples display the best results. The dashed lines are the unmodified, air-fired substrates, and emission currents are seen to be low over the entire range. The dash-dot lines in FIG. 4 are the emission currents from the electrochemically treated, air-fired samples. There is substantial emission starting at voltages of just over 3.5 V/μm, which is a substantial improvement over the results from the unmodified, air-fired samples.

Example 4

Modification with Cesium Carborane

Figure 5:
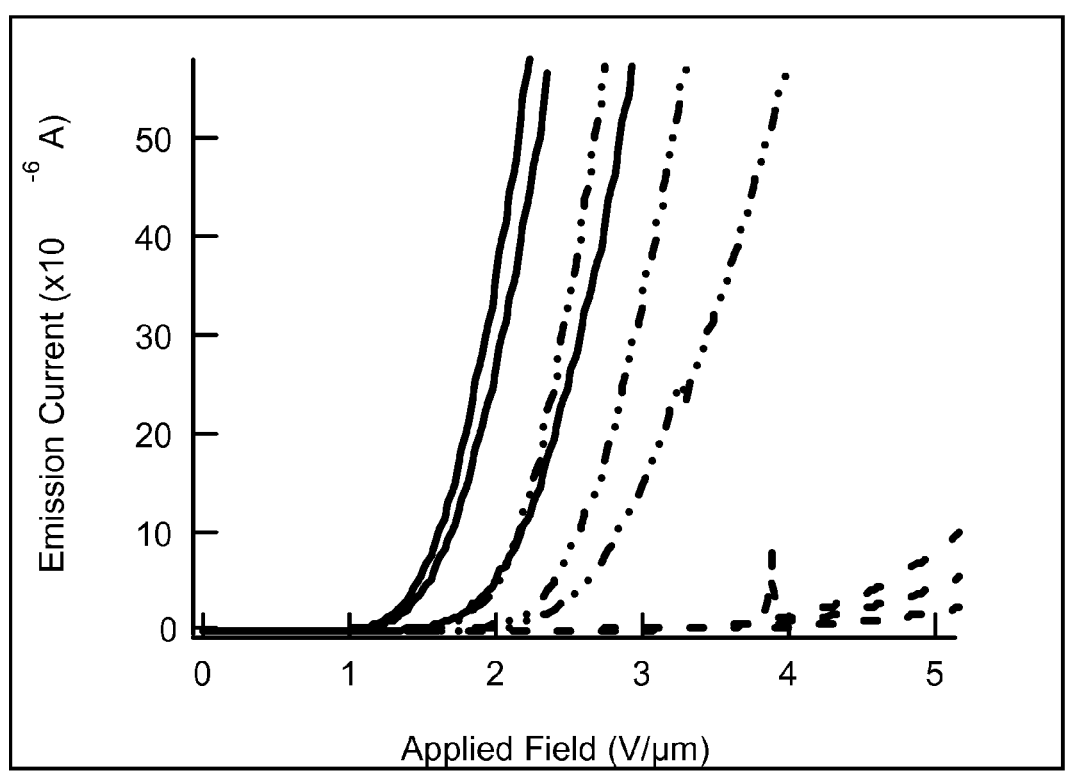
FIG. 5 shows the emission curves for samples treated with cesium carborane in an electrochemical cell as described in Example 4 and fired in air (dot-dash lines), and for control samples not subjected to electrochemical treatment before firing in air (dashed lines). This figure also shows the emission curves for untreated samples fired in nitrogen (solid lines).

Example 1 was repeated using cesium carborane, $CsCB_{11}H_{12}$, rather than TBE solution. The electrolyte contained 0.1% cesium carborane in water. The results are shown in FIG. 5. The solid lines are the emission current versus applied voltage for the unmodified, nitrogen-fired controls. Most, but not all, of the nitrogen-fired results are better than the dash-dot emission currents from the electrochemically, air-fired samples, for which there is substantial emission starting at voltages of under 2 V/μm. The results for the modified, air-fired samples are a substantial improvement over the results from the unmodified, air-fired samples shown as dashed lines.

As illustrated in the examples, electrochemical treatment according to the processes hereof can enhance the field emission of an electron emitting material.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present.

In this specification, unless explicitly stated otherwise or indicated to the contrary by the context of usage, amounts, sizes, ranges, formulations, parameters, and other quantities and characteristics recited herein, particularly when modified by the term "about", may but need not be exact, and may also be approximate and/or larger or smaller (as desired) than stated, reflecting tolerances, conversion factors, rounding off, measurement error and the like, as well as the inclusion within a stated value of those values outside it that have, within the context of this invention, functional and/or operable equivalence to the stated value.

What is claimed is:

1. A process for the electrochemical modification of an electron emitting material, comprising
    (a) providing an electrochemical cell that comprises
        (i) a cathode;
        (ii) an anode that comprises a layer of electron emitting material;
        (iii) an aqueous electrolyte in contact with the cathode and the layer of electron emitting material of the anode, wherein the electrolyte comprises a metallate;
        (iv) a first electrically-conducting pathway connecting the cathode to an electrical power supply; and
        (v) a second electrically-conducting pathway connecting the electrical power supply to the anode; and
    (b) applying a voltage to the electrochemical cell, wherein the metallate comprises a polyhedral borane or carborane.

2. A process according to claim 1 wherein the metallate comprises boric acid or a borate.

3. A process according to claim 1 wherein the metallate comprises a molybdenum compound.

4. A process according to claim 1 wherein the electron emitting material comprises carbon nanotubes.

5. A process according to claim 1 wherein, in the layer of electron emitting material, the electron emitting material resides therein in a pattern.

6. A process according to claim 1 wherein the anode comprises a substrate on which is deposited the layer of electron emitting material.

7. A process according to claim 6 wherein the substrate is conductive.

8. A process according to claim 6 wherein there is further deposited on the substrate a layer or pattern of conductive material.

9. A process for the electrochemical modification of an electron emitting material, comprising
    (a) providing an electrochemical cell that comprises
        (i) a cathode;
        (ii) an anode that comprises a layer of electron emitting material;
        (iii) an aqueous electrolyte in contact with the cathode and the layer of electron emitting material of the anode, wherein the electrolyte comprises a metallate;
        (iv) a first electrically-conducting pathway connecting the cathode to an electrical power supply; and
        (v) a second electrically-conducting pathway connecting the electrical power supply to the anode;
    (b) applying a voltage to the electrochemical cell,
    (c) depositing a layer of electron emitting material on a substrate, and incorporating the substrate into the electrochemical cell to provide the anode thereof; and
    (d) screen printing a paste of electron emitting material onto the substrate to deposit electron emitting material thereon.

10. A process according to claim 9 comprising patterning a photoresist material on the substrate, spreading a paste of electron emitting material on the photoresist material, and irradiating and developing the electron emitting material to deposit a layer thereof on the substrate.

11. A process according to claim 10 wherein the substrate is transparent, the photoresist material resides on a first side of the substrate, and the electron emitting material is irradiated from a second side of the substrate.

12. A process according to claim 6 further comprising removing the substrate from the electrochemical cell.

13. A process according to claim 12 further comprising installing the substrate in a field emission device.

14. A process according to claim 12 further comprising installing the substrate in a cathode assembly in, or to be installed in, a field emission device.

15. A process according to claim 14 further comprising installing the cathode assembly in a field emission device.

16. A process according to claim 12 further comprising washing, drying and firing the substrate.

17. A process according to claim 16 wherein the substrate is fired in air at a temperature in the range of about 250° C. to about 650° C.

18. A process according to claim 12 further comprising providing adhesive activation to the substrate.

* * * * *